United States Patent
Dawson et al.

(10) Patent No.: US 8,040,863 B2
(45) Date of Patent: Oct. 18, 2011

(54) DEMAND PULL AND SUPPLY PUSH COMMUNICATION METHODOLOGIES

(75) Inventors: Christopher J. Dawson, Arlington, VA (US); Peter G. Finn, Brampton (CA); Rick A. Hamilton, II, Charlottesville, VA (US); Jenny S. Li, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 1136 days.

(21) Appl. No.: 11/755,786

(22) Filed: May 31, 2007

(65) Prior Publication Data
US 2008/0300975 A1    Dec. 4, 2008

(51) Int. Cl.
*H04W 4/00*    (2009.01)
(52) U.S. Cl. .................................................. 370/338
(58) Field of Classification Search .................. 370/252, 370/254, 329, 338, 431, 437
See application file for complete search history.

(56) References Cited

U.S. PATENT DOCUMENTS

| | | | |
|---|---|---|---|
| 5,437,054 A * | 7/1995 | Rappaport et al. ............ 455/447 |
| 5,490,201 A | 2/1996 | Moberg et al. |
| 5,953,338 A | 9/1999 | Ma et al. |
| 6,006,084 A | 12/1999 | Miller et al. |
| 6,035,281 A | 3/2000 | Crosskey et al. |
| 6,047,268 A | 4/2000 | Bartoli et al. |
| 6,366,907 B1 | 4/2002 | Fanning et al. |
| 6,396,805 B2 | 5/2002 | Romrell |
| 6,397,061 B1 | 5/2002 | Jordan et al. |
| 6,522,735 B1 | 2/2003 | Fortman et al. |
| 6,653,933 B2 | 11/2003 | Raschke et al. |
| 6,751,196 B1 | 6/2004 | Hulyalkar et al. |
| 6,763,248 B1 | 7/2004 | Odamura |
| 6,810,428 B1 | 10/2004 | Larsen et al. |
| 6,850,764 B1 | 2/2005 | Patel |
| 6,941,378 B2 | 9/2005 | Apostolopoulos et al. |
| 6,954,616 B2 | 10/2005 | Liang et al. |
| 6,954,790 B2 | 10/2005 | Forslöw |
| 6,961,575 B2 | 11/2005 | Stanforth |
| 6,975,613 B1 | 12/2005 | Johansson |
| 6,980,511 B1 | 12/2005 | Li |
| 6,990,113 B1 | 1/2006 | Wang et al. |
| 7,016,375 B1 | 3/2006 | Rosenberg et al. |
| 7,028,096 B1 | 4/2006 | Lee |

(Continued)

FOREIGN PATENT DOCUMENTS

EP    0999662    5/2005

(Continued)

OTHER PUBLICATIONS

IEEE 802.22, Wireless RANs, 220 pages, Mar. 2006.*

(Continued)

*Primary Examiner* — Frank Duong
(74) *Attorney, Agent, or Firm* — William Schiesser; Roberts Mlotkowski Safran & Cole, P.C.

(57) ABSTRACT

Systems and methods for determining whether a node in a bandwidth-sharing ad hoc network should advertise as a borrower or a lender of bandwidth, or alternatively not advertise as either a borrower or lender of bandwidth. The method comprises establishing an ad-hoc network between nodes configured to be a borrower of bandwidth or a lender of bandwidth. At least one of the nodes advertises to be the borrower of bandwidth or the lender of bandwidth in the ad hoc network based on at least one selected factor.

25 Claims, 10 Drawing Sheets

U.S. PATENT DOCUMENTS

| | | |
|---|---|---|
| 7,043,225 B1 | 5/2006 | Patel et al. |
| 7,058,014 B2 | 6/2006 | Sim |
| 7,058,387 B2 | 6/2006 | Kumar et al. |
| 7,065,367 B2 | 6/2006 | Michaelis et al. |
| 7,075,890 B2 | 7/2006 | Ozer et al. |
| 7,085,281 B2 | 8/2006 | Thomas et al. |
| 7,089,301 B1 | 8/2006 | Labio et al. |
| 7,130,283 B2 | 10/2006 | Vogel et al. |
| 7,174,385 B2 | 2/2007 | Li |
| 7,224,964 B2 | 5/2007 | Souissi et al. |
| 7,240,015 B1 | 7/2007 | Karmouch et al. |
| 7,257,632 B2 | 8/2007 | Zhang et al. |
| 7,274,658 B2 | 9/2007 | Bornstein et al. |
| 7,310,641 B2 | 12/2007 | Moore et al. |
| 7,340,759 B1 | 3/2008 | Rodriguez |
| 7,376,747 B2 | 5/2008 | Hartop |
| 7,401,153 B2 | 7/2008 | Traversat et al. |
| 7,440,573 B2 | 10/2008 | Lor et al. |
| 7,447,656 B2 | 11/2008 | Parthasarathy |
| 7,450,517 B2 | 11/2008 | Cho |
| 7,450,949 B2 | 11/2008 | Choksi |
| 7,460,549 B1 | 12/2008 | Cardei et al. |
| 7,463,890 B2 | 12/2008 | Herz |
| 7,489,656 B2 | 2/2009 | Guo et al. |
| 7,530,102 B2 | 5/2009 | Moskowitz |
| 7,546,342 B2 | 6/2009 | Li et al. |
| 7,593,333 B2 | 9/2009 | Li et al. |
| 7,788,133 B2 | 8/2010 | Delenda |
| 7,830,834 B2 | 11/2010 | Das et al. |
| 2001/0029182 A1 | 10/2001 | McCann et al. |
| 2002/0053033 A1 | 5/2002 | Cooper et al. |
| 2002/0053082 A1 | 5/2002 | Weaver et al. |
| 2002/0058499 A1 | 5/2002 | Ortiz |
| 2002/0061009 A1 | 5/2002 | Sorensen |
| 2002/0069278 A1 | 6/2002 | Forslöw |
| 2002/0102987 A1 | 8/2002 | Souisse et al. |
| 2002/0110110 A1 | 8/2002 | Tiihonen et al. |
| 2002/0120873 A1 | 8/2002 | Salmivalli |
| 2002/0122410 A1 | 9/2002 | Kulikov et al. |
| 2002/0141358 A1 | 10/2002 | Requena |
| 2002/0145978 A1 | 10/2002 | Batsell et al. |
| 2003/0068975 A1 | 4/2003 | Qiao et al. |
| 2003/0117978 A1 | 6/2003 | Haddad |
| 2003/0120594 A1 | 6/2003 | Shaginaw et al. |
| 2003/0137976 A1 | 7/2003 | Zhu et al. |
| 2003/0139180 A1 | 7/2003 | McIntosh et al. |
| 2003/0153338 A1 | 8/2003 | Herz et al. |
| 2003/0235174 A1 | 12/2003 | Pichna et al. |
| 2004/0006621 A1 | 1/2004 | Bellinson et al. |
| 2004/0029553 A1 | 2/2004 | Cain |
| 2004/0064351 A1 | 4/2004 | Mikurak |
| 2004/0078323 A1 | 4/2004 | Johnston et al. |
| 2004/0100929 A1 | 5/2004 | Garcia-Luna-Aceves |
| 2004/0128231 A1 | 7/2004 | Morita |
| 2004/0156312 A1 | 8/2004 | Salonidis et al. |
| 2004/0162871 A1 | 8/2004 | Pabla et al. |
| 2004/0165548 A1 | 8/2004 | Backes |
| 2004/0185777 A1 | 9/2004 | Bryson |
| 2004/0192204 A1 | 9/2004 | Periyalwar et al. |
| 2004/0260808 A1 | 12/2004 | Strutt |
| 2004/0264466 A1 | 12/2004 | Huang |
| 2005/0063419 A1 | 3/2005 | Schrader et al. |
| 2005/0080872 A1 | 4/2005 | Davis et al. |
| 2005/0111418 A1 | 5/2005 | Yang et al. |
| 2005/0153725 A1 | 7/2005 | Naghian et al. |
| 2005/0157661 A1 | 7/2005 | Cho |
| 2005/0169209 A1 | 8/2005 | Miu et al. |
| 2005/0169257 A1 | 8/2005 | Lahetkangas et al. |
| 2005/0193221 A1 | 9/2005 | Yoneyama |
| 2005/0203834 A1 | 9/2005 | Prieston |
| 2005/0213503 A1 | 9/2005 | Guo et al. |
| 2006/0002326 A1 | 1/2006 | Vesuna |
| 2006/0034330 A1 | 2/2006 | Iwamura |
| 2006/0085543 A1 | 4/2006 | Hrastar et al. |
| 2006/0095582 A1 | 5/2006 | Nitya et al. |
| 2006/0114853 A1 | 6/2006 | Hasty et al. |
| 2006/0126504 A1 | 6/2006 | Meier et al. |
| 2006/0167784 A1 | 7/2006 | Hoffberg |
| 2006/0176829 A1 | 8/2006 | McLaughlin et al. |
| 2006/0179143 A1 | 8/2006 | Walker et al. |
| 2006/0187858 A1 | 8/2006 | Kenichi et al. |
| 2006/0193295 A1 | 8/2006 | White et al. |
| 2006/0224502 A1 | 10/2006 | McGowan |
| 2007/0005797 A1 | 1/2007 | Fontijn et al. |
| 2007/0117537 A1* | 5/2007 | Hui et al. .......... 455/405 |
| 2007/0140272 A1 | 6/2007 | Gulliksson |
| 2008/0008140 A1* | 1/2008 | Forssell .......... 370/338 |
| 2008/0040481 A1 | 2/2008 | Joshi et al. |
| 2008/0167982 A1 | 7/2008 | Leo et al. |
| 2008/0281529 A1 | 11/2008 | Tenenbaum et al. |
| 2010/0205116 A1 | 8/2010 | Erlanger |

FOREIGN PATENT DOCUMENTS

| | | |
|---|---|---|
| WO | 9915960 | 4/1999 |
| WO | 03037009 | 5/2003 |
| WO | 04001585 | 12/2003 |
| WO | 2006004628 | 1/2006 |

OTHER PUBLICATIONS

Michelini et al, Spectral Sharing Across 2G-3G Systems, IEEE, 5 pages, 2003.*

Das et al, A Structured Channel Borrowing Scheme for Dynamic Load Balancing in Cellular Networks, IEEE, 8 pages, 1997.*

Non-final Office Action dated Nov. 25, 2009 in U.S. Appl. No. 11/755,780.

Non-final Office Action dated Nov. 25, 2009 in U.S. Appl. No. 11/755,802.

Non-Final Office Action dated Mar. 4, 2010 in U.S. Appl. No. 11/755,775.

Final Office Action dated Mar. 5, 2010 in U.S. Appl. No. 11/755,788.

Non-Final Office Action dated Mar. 22, 2010 in U.S. Appl. No. 11/755,782.

Non-Final Office Action dated Mar. 18, 2010 in U.S. Appl. No. 11/755,763.

Non-Final Office Action dated Jan. 25, 2010 in U.S. Appl. No. 11/755,771.

Non-final Office Action dated Dec. 24, 2009 in U.S. Appl. No. 11/755,776.

Non-final Office Action dated Jan. 22, 2010 in U.S. Appl. No. 11/755,778.

Non-final Office Action dated Jan. 21, 2010 in U.S. Appl. No. 11/755,808.

Luo, Haiyun, Ramachandran Ramjee, Prasun Sinha, Li (Erran) Li, and Songwu Lu. "UCAN: A Unified Cellular and Ad-Hoc Network Architecture." MobiCom '03, Proceedings of the 9th Annual International Conference on Mobile Computing and Networking. New York, NY, USA: ACM Press, 2003, pp. 353-367.

Non-final Office Action dated Oct. 19, 2009 in U.S. Appl. No. 11/755,788.

Qui et al.. "Bandwidth in Ad Hoc Networks: A Price-Based Approach," 2003, IEEE, pp. 1-10.

D. Zhu et al., "QoS Aware Wireless Bandwidth Aggregation (QAWBA) by Integrating Cellular and Ad-hoc Networks."

D. Zhu et al., "Using Cooperative Multiple Paths to Reduce File Download Latency in Cellular Data Networks."

Non-final Office Action dated Dec. 23, 2008 in U.S. Appl. No. 11/755,806.

Final Office Action dated Jun. 3, 2009 in U.S. Appl. No. 11/755,806.

Final Office Action dated Jun. 9, 2009 in U.S. Appl. No. 11/755,806.

Final Office Action dated Nov. 26, 2010 in U.S. Appl. No. 11/755,775.

Notice of Allowance dated Dec. 14, 2010 in U.S. Appl. No. 11/755,776.

Office Action dated Jan. 24, 2011 in U.S. Appl. No. 11/755,779.

Notice of Allowance dated Feb. 14, 2011 in U.S. Appl. No. 11/755,788.

Notice of Allowance dated Aug. 25, 2010 in U.S. Appl. No. 11/755,780.

Office Action dated Sep. 14, 2010 in U.S. Appl. No. 11/755,788.

Final Office Action dated Sep. 15, 2010 in U.S. Appl. No. 11/755,782.

Notice of Allowance dated Oct. 12, 2010 in U.S. Appl. No. 11/755,808.
Office Action dated Mar. 3, 2011 in U.S. Appl. No. 11/755,800.
Office Action dated Jun. 4, 2010 in U.S. Appl. No. 11/755,780.
Office Action dated Jun. 22, 2010 in U.S. Appl. No. 11/755,776.
Office Action dated Jul. 12, 2010 in U.S. Appl. No. 11/755,808.
Notice of Allowance dated Jun. 9, 2010 in U.S. Appl. No. 11/755,802.
Notice of Allowance dated Jun. 28, 2010 in U.S. Appl. No. 11/755,771.
Notice of Allowance dated Jul. 13, 2010 in U.S. Appl. No. 11/755,778.
Notice of Allowance dated Aug. 16, 2010 in U.S. Appl. No. 11/755,763.
Office Action dated Jul. 21, 2011 in U.S. Appl. No. 11/755,775.
Office Action dated Jul. 26, 2011 in U.S. Appl. No. 11/755,779.
Office Action dated Aug. 18, 2011 in U.S. Appl. No. 11/755,800.

* cited by examiner

| Node Name | Node Type | Location | File Requested for Transfer | Price | Service Level Objective | Current Quality of Service |
|---|---|---|---|---|---|---|
|  |  |  |  |  |  |  |
|  |  |  |  |  |  |  |

Figure 4

| FACTOR | VALUE | WEIGHT | WEIGHTED FACTOR |
|---|---|---|---|
| *Current Bandwidth Need* | | | |
| current bandwidth required | | | |
| current bandwidth capacity | | | |
|     current bandwidth need ratio | | | |
| *Download Urgency* | | | |
| fixed period | | | |
| download window | | | |
| download time | | | |
|     download urgency ratio | | | |
| *Bandwidth Sharing* | | | |
| bandwidth lent | | | |
| bandwidth borrowed | | | |
|     bandwidth sharing ratio | | | |
| *Current Market Driven Price* | | | |
| current market price | | | |
| average market price | | | |
|     market price ratio | | | |
| *Current Fixed Price* | | | |
| current fixed price | | | |
| average fixed price | | | |
|     fixed price ratio | | | |
| *Importance of Payment* | | | |
| importance of payment number | | | |
|     importance of payment ratio | | | | final weighted value =

Figure 5

| FACTOR | VALUE | WEIGHT | WEIGHTED FACTOR |
|---|---|---|---|
| Current Bandwidth Need | | | |
| current bandwidth required | 100 | | |
| current bandwidth capacity | 125 | | |
| current bandwidth need ratio | | 30% | |
| Download Urgency | | | |
| fixed period | 4 | | |
| download window | 8 | | |
| download time | 1 | | |
| download urgency ratio | | 15% | |
| Bandwidth Sharing | | | |
| bandwidth lent | 50 | | |
| bandwidth borrowed | 30 | | |
| bandwidth sharing ratio | | 20% | |
| Current Market Driven Price | | | |
| current market price | 10 | | |
| average market price | 8 | | |
| market price ratio | | 15% | |
| Current Fixed Price | | | |
| current fixed price | 10 | | |
| average fixed price | 12 | | |
| fixed price ratio | | 12% | |
| Importance of Payment | | | |
| importance of payment number | 0.5 | | |
| importance of payment ratio | | 8% | | final weighted value =

Figure 6

| FACTOR | VALUE | WEIGHT | WEIGHTED FACTOR |
|---|---|---|---|
| *Current Bandwidth Need* | | | |
| current bandwidth required | 100 | | |
| current bandwidth capacity | 125 | | |
| current bandwidth need ratio | 0.8 | 30% | 0.24 |
| *Download Urgency* | | | |
| fixed period | 4 | | |
| download window | 8 | | |
| download time | 1 | | |
| download urgency ratio | 0.571428571 | 15% | 0.085714286 |
| *Bandwidth Sharing* | | | |
| bandwidth lent | 50 | | |
| bandwidth borrowed | 30 | | |
| bandwidth sharing ratio | 1.666666667 | 20% | 0.333333333 |
| *Current Market Driven Price* | | | |
| current market price | 10 | | |
| average market price | 8 | | |
| market price ratio | 0.8 | 15% | 0.12 |
| *Current Fixed Price* | | | |
| current fixed price | 10 | | |
| average fixed price | 12 | | |
| fixed price ratio | 1.2 | 12% | 0.144 |
| *Importance of Payment* | | | |
| importance of payment number | 0.5 | | |
| importance of payment ratio | 0.5 | 8% | 0.04 | final weighted value = 0.963047619

Figure 7

| FACTOR | VALUE | WEIGHT | WEIGHTED FACTOR |
|---|---|---|---|
| *Current Bandwidth Need* | | | |
| current bandwidth required | 100 | | |
| current bandwidth capacity | 125 | | |
| current bandwidth need ratio | 0.8 | 30 | 0.292682927 |
| *Download Urgency* | | | |
| fixed period | 4 | | |
| download window | 8 | | |
| download time | 1 | | |
| download urgency ratio | 0.571428571 | 20 | 0.139372822 |
| *Bandwidth Sharing* | | | |
| bandwidth lent | 50 | | |
| bandwidth borrowed | 30 | | |
| bandwidth sharing ratio | 1.666666667 | 3 | 0.06097561 |
| *Current Market Driven Price* | | | |
| current market price | 10 | | |
| average market price | 8 | | |
| market price ratio | 0.8 | 10 | 0.097560976 |
| *Current Fixed Price* | | | |
| current fixed price | 10 | | |
| average fixed price | 12 | | |
| fixed price ratio | 1.2 | 7 | 0.102439024 |
| *Importance of Payment* | | | |
| importance of payment number | 0.5 | | |
| importance of payment ratio | 0.5 | 12 | 0.073170732 |
| | weighting total = | 82 | |
| | final weighted value = | | 0.766202091 |

Figure 8

DEMAND PULL AND SUPPLY PUSH COMMUNICATION METHODOLOGIES

CROSS-REFERENCE TO RELATED APPLICATIONS

This application is related to the following copending applications, all of which are incorporated herein by reference in their entireties: Copending application Ser. No. 11/755,808, published as U.S. Pub. No. 2008/0301017; copending application Ser. No. 11/755,780, published as U.S. Pub. No. 2008/0298327; and copending application Ser. No. 11/755,775, published as U.S. Pub. No. 2008/0301017.

FIELD OF THE INVENTION

The invention generally relates to systems and methods for determining whether a node in a bandwidth-sharing ad hoc network should advertise as a borrower or a lender of bandwidth, or alternatively not advertise as either a borrower or lender of bandwidth.

BACKGROUND OF THE INVENTION

Mobile computing is becoming increasingly pervasive, and will approach ubiquity in wireless devices (e.g., notebook computers, smart phones, personal digital assistants (PDAs), etc.) over the next decade. One consistent trend in this mobile computing space is the fact that such platforms increasingly communicate over a variety of wireless protocols. Common protocols in use today for wireless data transfer include EV-DO, IEEE 802.11a/b/g, ZigBee® (registered trademark of ZIGBEE ALLIANCE of California), Bluetooth® (registered trademark of BLUETOOTH SIG, INC. of Delaware), and many other related protocols. By their very nature, differentials do exist, and will continue to exist, between the speed, or bandwidth, with which mobile devices can communicate with each other, vis-à-vis communications speeds with the broader network where a device's target data may reside.

It is often the case that a wireless device will have a relatively fast wireless connection to other local devices and a relatively slow wireless connection to the broader network (e.g., the Internet). For example, local wireless connections, provided by protocols such as IEEE 802.11a, 802.11b, 802.11g, 802.15.1 (e.g., Bluetooth®), and 802.15.4 (e.g., Zigbee®) provide fast data transfer rates of about 3 to 54 megabits per second (Mbps). However, such transfer protocols often have a limited maximum transmission range of about 30 to 300 ft. On the other hand, wireless telephony protocols (e.g., EV-DO, CDMA, EDGE, GPRS, etc.) have relatively large maximum transmission ranges on the order of miles, but only provide data transfer rates of about 10 kilobits per second (kbps) to 1 Mbps. Thus, while a user of a mobile device may enjoy relatively fast data transfer amongst local devices, the user is often limited to a slow wireless connection to the outside world (e.g., the Internet).

Accordingly, there exists a need in the art to overcome the deficiencies and limitations described hereinabove.

SUMMARY OF THE INVENTION

In a first aspect of the invention, a method comprises establishing an ad-hoc network between nodes configured to be a borrower or a lender of bandwidth. The method further comprises at least one of the nodes advertising to be the borrower or the lender of bandwidth in the ad hoc network based on at least one selected factor.

In another aspect of the invention, the method comprises selecting pertinent factors based on a willingness to be a lender or a borrower of bandwidth in an ad hoc network. The method further comprises advertising as the borrower or the lender based on the selected pertinent factors to establish a bandwidth-sharing ad-hoc network.

In another aspect of the invention, a method for providing a formation of a multiplexed ad-hoc network comprises providing a computer infrastructure being operable to establish an ad-hoc network between at least one borrower and at least one lender of bandwidth by permitting advertising as a borrower or a lender of bandwidth. The method further comprises the advertising being based on at least one selected factor.

In another aspect of the invention, a system comprises a server having a database containing data associated with nodes capable of being lenders and borrowers in an ad-hoc network, the database further containing a selection of pertinent factors used by the nodes to determine whether the nodes should advertise as a lender or a borrower in the ad hoc network. The system further comprises at least one of a hardware and software component for establishing the ad-hoc network between the borrowers and lenders of bandwidth by using certain factors of the pertinent factors in making a determination as to whether the nodes advertise as either the lender or the borrower.

In yet another aspect of the invention, a computer program product comprises a computer usable medium having readable program code embodied in the medium. The computer program product includes at least one component to establish an ad-hoc network between at least one borrower of bandwidth and at least one lender of bandwidth by permitting advertising as a borrower or a lender of bandwidth being based on at least one selected factor.

BRIEF DESCRIPTION OF THE DRAWINGS

FIG. 4 shows an example table created and used in implementing aspects of the invention;

FIGS. 5-8 show example tables created and used in implementing aspects of the invention.

DETAILED DESCRIPTION OF EMBODIMENTS OF THE INVENTION

The invention generally relates to systems and methods for determining whether a node in a bandwidth-sharing ad hoc network should advertise as a borrower or a lender of bandwidth, or alternatively not advertise as either a borrower or lender of bandwidth. By implementing the methods and systems of the invention, e.g., determining whether a node in a bandwidth-sharing ad hoc network should advertise as a borrower or a lender of bandwidth, multiple disparate wireless connections in conjunction with multiple devices using a variety of service providers, for example, can be used to create a single virtual fat pipe for transmission of data over a network. The individuals who share their current connections, i.e., bandwidth, acting as gateway devices, are "lenders" of bandwidth; whereas, the individuals who require additional bandwidth are "borrowers".

System Environment

Figure 1:
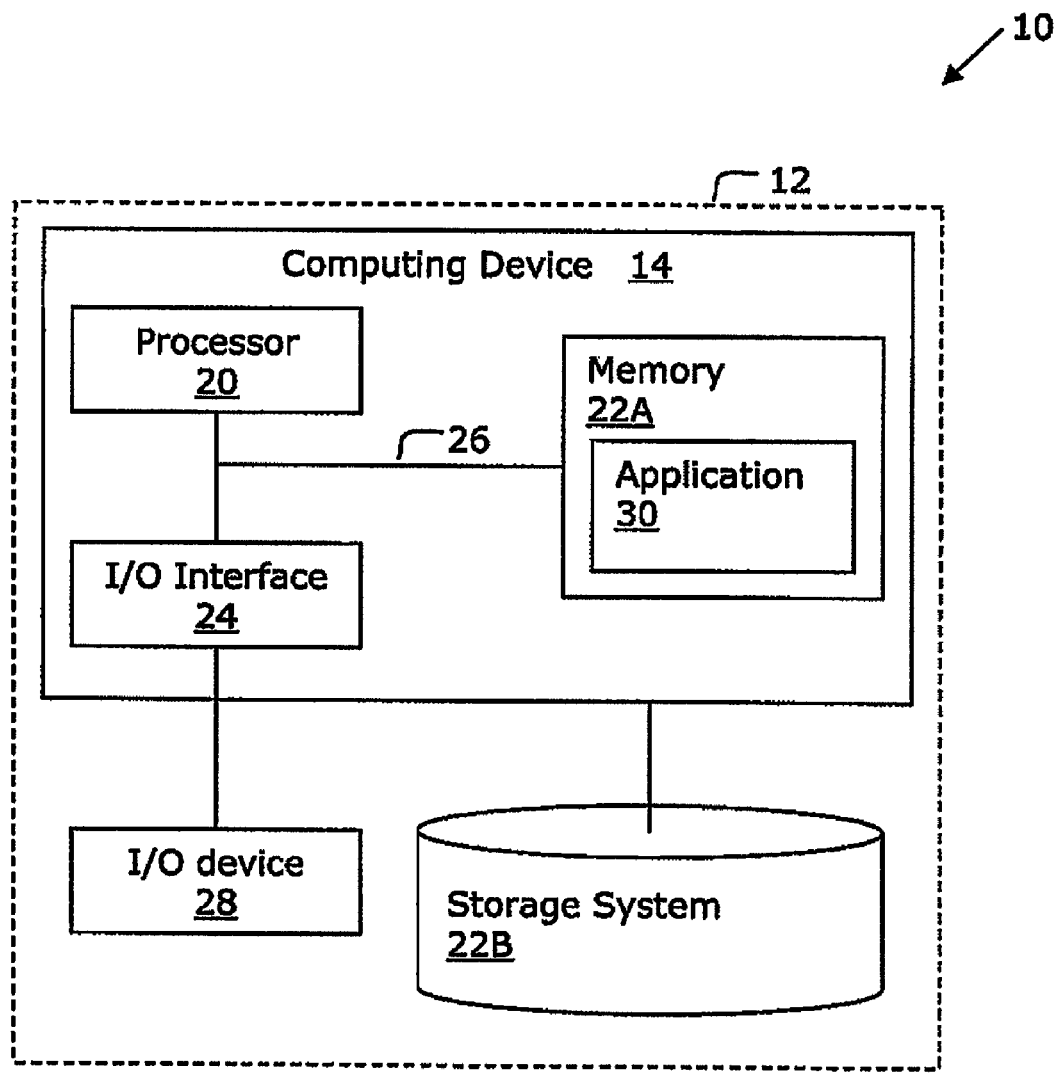
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a management system 30, which makes computing device 14 operable to determine whether a node in a bandwidth-sharing ad hoc network should advertise as a borrower or a lender of bandwidth, or alternatively not advertise as either a borrower or lender of bandwidth, in accordance with the invention, e.g., the processes described herein. The computing device 14 may be implemented in the lender's device, borrower's device or a third party, such as a service provider. The computing device includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28 and a storage system 22B. The external I/O device/resource 28 may be keyboards, displays, pointing devices, etc.

In general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to computer infrastructure 12 using any type of communications link used by ad hoc networks, as described herein. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

General Overview of Ad hoc Network

"Ad hoc" relationships are becoming increasingly important in the communal sharing of immediately available resources, and most particularly, the sharing of bandwidth. With the creation of peer-to-peer networks and bit torrent type services a file may be stored in a large number of locations to allow very fast download of the file in sections simultaneously from multiple locations. Groups of devices may congregate, or coexist, in one place and each may have limited bandwidth to the outside world. However, the groups of devices may have high bandwidth to other devices within close proximity. An example is a 802.11g local area connection that creates a high-speed wireless connection between two cellular phone devices within close range (high bandwidth), and wherein the cellular phones' cellular connection to the outside world may provide bandwidth at less than one percent of the 802.11g connection.

In embodiments of the invention, a node in a bandwidth-sharing ad hoc network may determine whether to advertise as a borrower or a lender of bandwidth, or alternatively not advertise as either a borrower or lender of bandwidth. In embodiments, an individual node may use factors pertinent to their decision to advertise as a borrower or a lender of bandwidth. In embodiments, a node may also use certain factor variables in determining whether to advertise as a borrower or a lender of bandwidth. In embodiments, weightings are implemented and used to weight the factors and determine a final value in determining whether to advertise as a borrower or a lender of bandwidth.

Implementing the processes of the invention, an ad hoc network may be created between a borrower node and one or more lender nodes. This process may include both an initial discovery mechanism of the proposed role each node may play, and a negotiation and acceptance of the agreed compensation scheme.

Figure 2A:
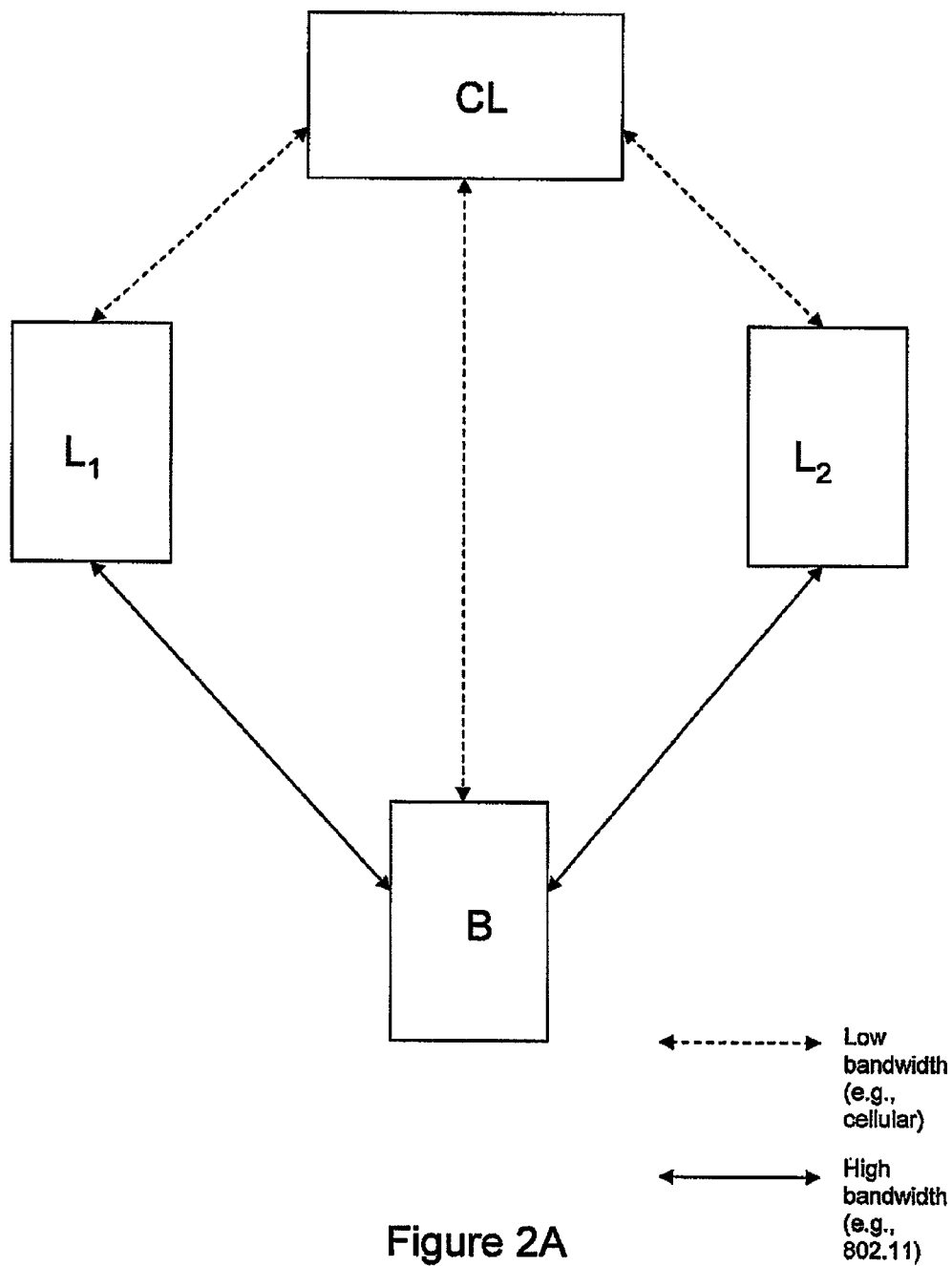
FIG. 2A is an overview of a peer-to-peer ad hoc network.

FIG. 2A is a general overview of a non-multiplexed, peer-to-peer (P2P) bandwidth sharing architecture which may be implemented with the systems and methods of the invention. An illustrative non-multiplexed, peer-to-peer (P2P) bandwidth sharing architecture is set forth in co-pending application Ser. No. 11/755,808.

In the implementation of FIG. 2A, a borrower B may request information, e.g., transfer of files, from a central location, CL (or distributed locations). To increase its bandwidth capacity, the borrower B may request bandwidth from any of the lenders, $L_1$ or $L_2$ via any known wireless protocol. By way of example, upon a broadcast request from the borrower B, any of the lenders, $L_1$ or $L_2$ may allow the borrower B to use their excess bandwidth for file transfers with the central location, CL (or distributed locations). Upon authorization, the lenders, via a wireless protocol, for example, will download information from the central locations, CL (or distributed locations), and send this information to the borrower, B, thus effectively increasing the borrower's bandwidth. It should be understood that data could be transferred from distributed locations, rather than the central location, CL.

Figure 2B:
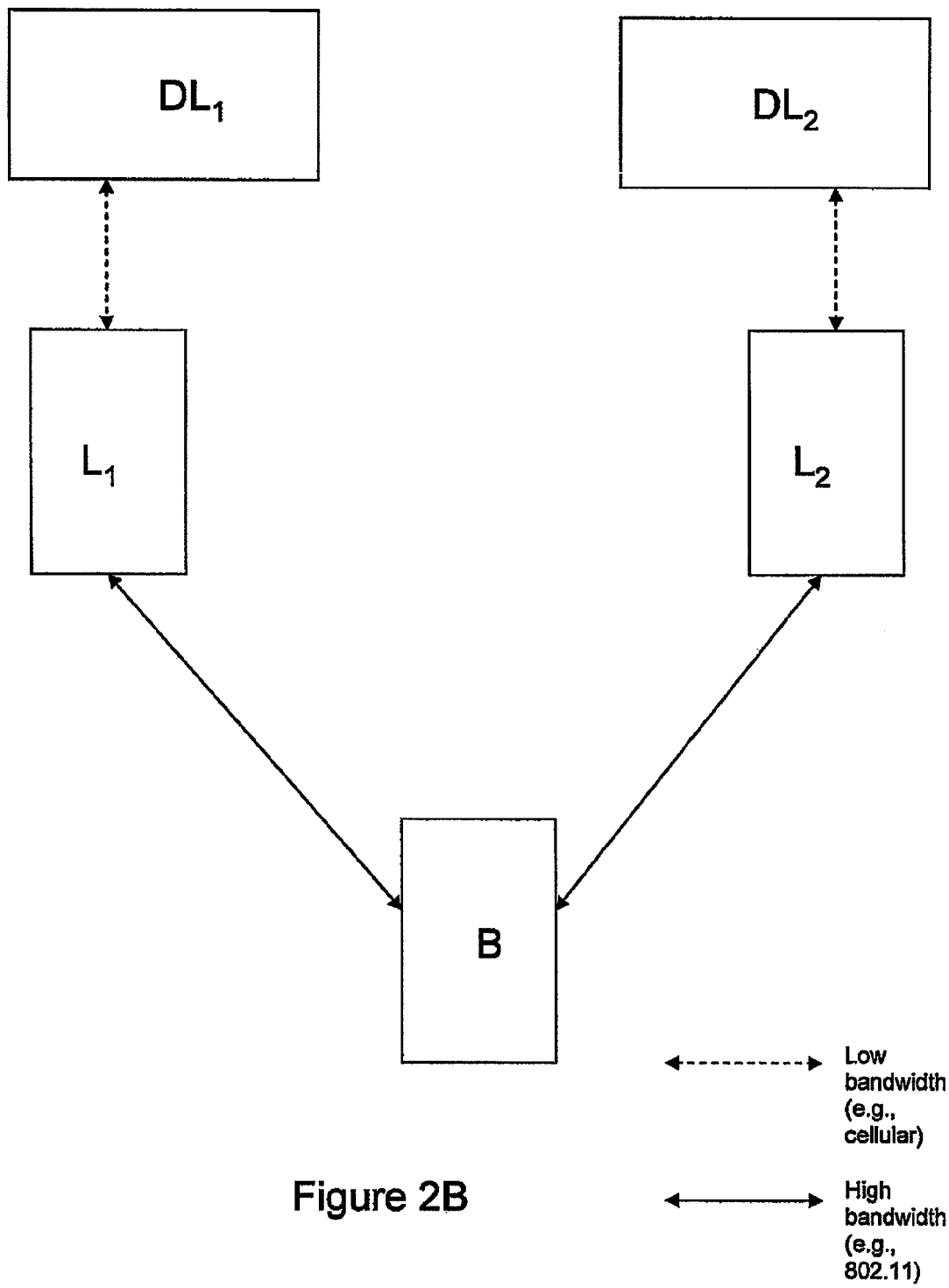
FIG. 2B is an overview of an alternative peer-to-peer ad hoc network.

FIG. 2B is a general overview of a multiple source ad hoc network. In this implementation, a borrower B may request information, e.g., transfer of files, from distributed locations $DL_1$ and $DL_2$. Each distributed location $DL_1$ and $DL_2$ has a same copy of the requested data, and $L_1$ connects to $DL_1$ and $L_2$ connects to $DL_2$.

Figure 3:
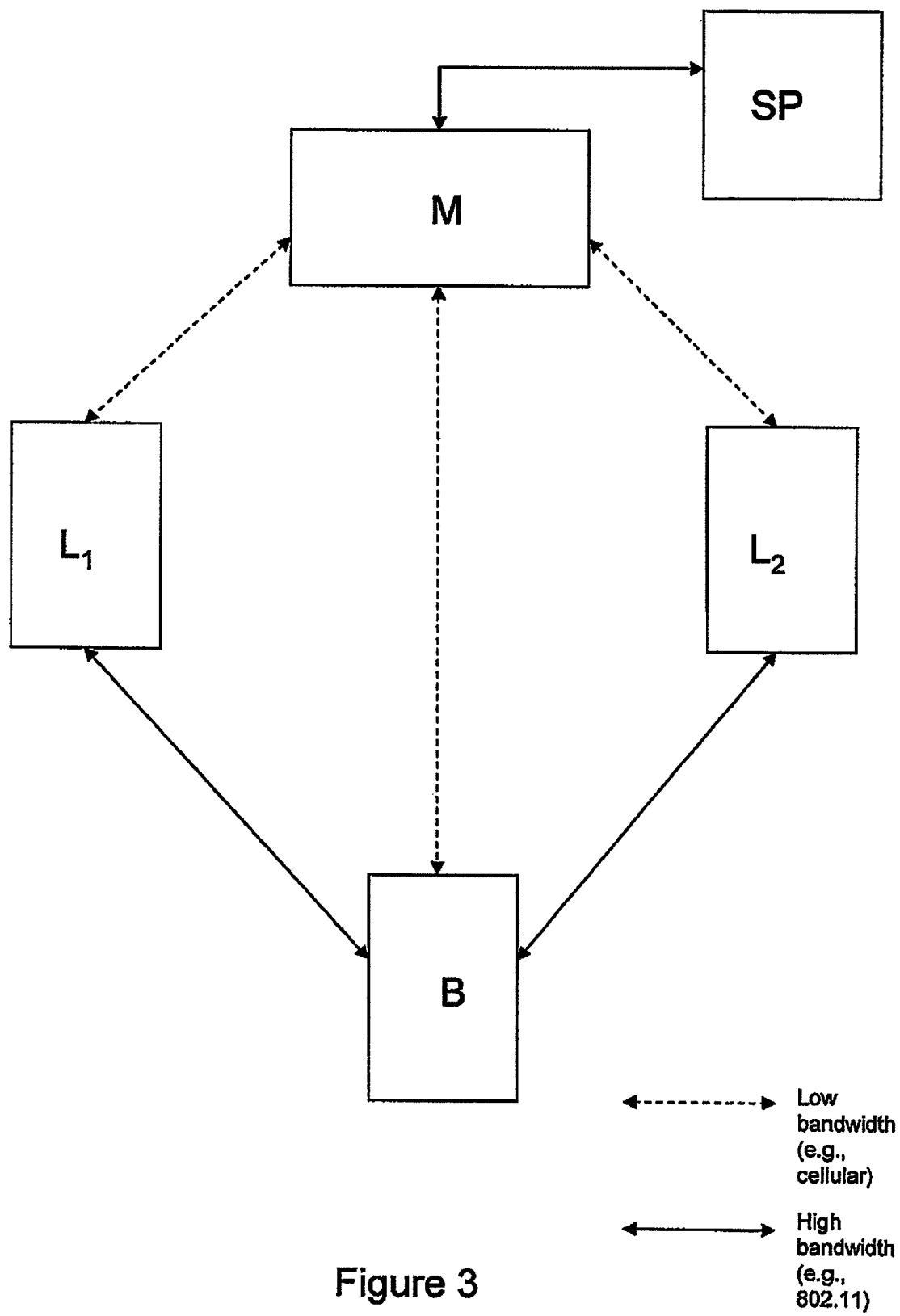
FIG. 3 is an overview of an ad hoc network implementing services of a multiplexer.

FIG. 3 is a general overview of a multiplexed gateway bandwidth sharing architecture which may be implemented with the invention. An illustrative multiplexed, gateway bandwidth-sharing architecture is set forth in co-pending application Ser. No. 11/755,780. In the implementation of FIG. 3, a borrower B will request a multiplexer M to set up an ad-hoc network. The multiplexer M may communicate with a service provider SP and connect to one or more lenders, $L_1$ and $L_2$, via a wireless network. In this implementation, the borrower may initially broadcast a message for lenders and, upon receipt of a response, transmit the lender locations and other criteria to the multiplexer. Once a network is established, the multiplexer will manage the network, including the bandwidth allocations provided by each of the lenders, for example. The multiplexer may also be the service provider.

Initial Formation of the Ad hoc Network

In either the peer-to-peer or gateway environments described above, in order to form a new ad hoc network, a borrower may scan all available potential lenders and prioritize the potential lenders for a data transfer. An illustrative formation and rearrangement of ad hoc network bandwidth-sharing architecture is set forth in co-pending application Ser. No. 11/755,775.

The formation of the ad hoc network, in embodiments, may use a "borrower/lender" table as shown in FIG. 4. In this example, the borrower or gateway (e.g., multiplexer) will broadcast the table to potential lenders which, in turn, will return the table, with information pertinent to the lender, to the borrower or the gateway. Using this information, the borrower or lender can establish an ad hoc network with lenders that meet certain criteria, e.g., reliability, speed, availability and/or costs.

In the borrower/lender table of FIG. 4, the "Node Name" column may be the unique identifier of a node such as the borrower and lenders. For example, this could be a hostname, a Bluetooth® name or any other information that can uniquely describe the node. The "Node Type" column may describe whether this node is a borrower, a lender, or a multiplexed gateway. The "Location" column may be an IP address, Wi-Fi address, Bluetooth address, MAC address or any other attribute that can be used to locate the node. The "File Requested for Transfer" column may be used to store information about the file (or piece of file) to be transferred. This may be an HTTP address, an FTP address or other information to describe where and how the data is to be found. The "Service Level Objective" column may describe the negotiated service levels of the node. For example, the requested bandwidth, the availability of the node, reliability and so forth. The "Current Quality of Service" column may contain the current quality of service (QoS) of the node. The QoS information may contain a status of the node, e.g., how well the service levels are being met, the current transfer rate, or the current progress of the file download.

The "Price" column may be a price set by the lender to use the lender's bandwidth. The price may be stated in a price/data volume, a price/time, a price/data volume and a price/time, a price/time with a data cap, or a one-time price, to name a few different variations. Additionally the price may be stated as a number of minutes to be used in a wireless service plan, or any other charging mechanism.

In aspects of the invention, a borrower and a lender may not see all of the table on their respective devices, and some of the table information may be generated automatically. The user interface may require less display space and may require less user input. For example, the location of a lender's device or borrower's device may be known by the device itself. Thus, the user may not need to complete this portion of the table. Rather, the information for that portion of the table may be automatically completed by the device. Furthermore, the automatic generation of the information in the table may also apply to the Node Type, Node Name, Service Level Objective, Price and Current Quality of Service columns. For example, a borrower may have preset levels of service level objectives that they require whenever they borrow bandwidth, so that generation of the Service Level Objective column may be performed automatically by the borrower's device. Additionally, a potential lender may have a set price for lending bandwidth already input into their device such that the Price column information is automatically generated.

In one illustrative example, a borrower may initially generate the table by clicking on an icon, and when prompted, input the File Requested for Download information. The borrower's device could generate the remaining portions of the information in the table. When a potential lender receives the borrower's request, their device may simply prompt for a decision to be a lender. If the potential lender answers "yes", then the potential lender's device may prompt the potential lender for a price. As set forth above, the rest of the information in the table may be generated automatically. Illustrative cases of formation and rearrangement of a bandwidth-sharing ad hoc network architecture are set forth in co-pending application Ser. No. 11/755,775.

Factors Affecting Role of Node

In order to be a participant in the bandwidth-sharing ad hoc network, a node may first decide whether it should advertise to the other members of the ad hoc network as a borrower node or a lender node. Alternatively, a node may decide not to advertise as either a borrower node or a lender node.

In order to make the determination of what role a node may play, a node, for example, may evaluate some or all of several factors, including:
1) current bandwidth need;
2) download urgency;
3) bandwidth sharing history;
4) current market driven price for bandwidth;
5) current fixed price for bandwidth; and/or
6) importance for the node to receive money for lent bandwidth.

Each factor may have an associated value, and each of the values determined from these factors may be analyzed to determine what role a node may play in the bandwidth-sharing ad hoc network, as discussed further below.

With each of the above factors, a value may be determined, that may suggest that a node advertise as a borrower or a lender based on such factor. These values may be expressed as ratios. For example, a node may determine to advertise as a borrower or lender based on some or all of the below ratios:

1) a current bandwidth need ratio;
2) a download urgency ratio;
3) a bandwidth sharing ratio;
4) a current market driven price ratio;
5) a current fixed price ratio; and/or
6) an importance of payment ratio.

In embodiments, each of these ratios may represent equilibrium at 1, such that a value of 1 would suggest a node not advertise as a lender or a borrower. Additionally, a value of less then 1 may suggest that a node advertise as a lender, and a value of more than 1 may suggest that a node advertise as a borrower.

In embodiments, a node may consider more than one of the several factors pertinent to their determination of whether to advertise as a borrower or lender in a bandwidth-sharing ad hoc network. In these cases, a weighting may be used to determine if the node should advertise as a lender or a borrower. The weighting may be used to, for example, provide more or less emphasis on a particular factor. For example, once the factor ratios are determined, each of some or all of these factor ratios may be assigned a weighting so that the factor ratios may be weighted relative to each other. The weighting may be performed by the node or a service provider. In this manner, the node or service provider may assign priorities to some or all of the different factors based on, e.g., the node's individual preferences. The weighting of the some or all of the factor ratios may result in weighted factors.

In embodiments, as discussed in greater detail below, the weighted factors may be summed to determine a final weighted value. The final weighted value may be used in a determination as to whether a node should advertise as a lender or a borrower, and to what extent. The final weighted value may also indicate that the node take no action, i.e., not advertise as a lender or a borrower.

In embodiments, where a node may consider only one of the several factors pertinent to their determination of whether to advertise as a borrower or lender in a bandwidth-sharing ad hoc network, no weighting may be necessary. As discussed below, a node may determine a factor value, or factor ratio, for one pertinent factor, and determine whether to advertise as a borrower or a lender, or not advertise as either, based on the factor value or factor ratio for that pertinent factor. Additionally, when a node deems only one factor is pertinent to their determination, the factor value or factor ratio may be considered a final value.

The node may be considered the node device or the user of the node, i.e., node user. The node device is the device being used to connect to others in the ad hoc network and lend or borrow bandwidth. The node user is the human using the node device. For example, a node device may determine some or all of the factor ratio variables, including current bandwidth capacity, bandwidth lent, bandwidth borrowed, current market price, average market price, current fixed price and average fixed price. Thus, a node device may enter these values without the node user's interaction. Additionally, the node user may determine the factor ratio variables and manually input those values to determine the factor ratios. Additionally, the node device may enter the weightings without the node user's interaction, for example, if the node user has already predetermined the weightings and stored those weightings in the node device.

In further embodiments, member nodes of an ad hoc network may be connected to a central server or a multiplexing service, where the central server or multiplexing service may determine some or all of the factor ratio variables, including, e.g., current bandwidth capacity, bandwidth lent, bandwidth borrowed, current market price, average market price, current fixed price and average fixed price. With this embodiment, the central server or multiplexing service may act as a central register or clearing house of information, e.g., maintaining and providing individual node bandwidth sharing histories, market prices, and fixed prices. In this embodiment, a node user or a node device may not need to enter the factor ratio variables.

In further embodiments, the factor ratio variables may be determined by both a central server (e.g., multiplexing service) and a node device or node user. For example, a central server may determine the fixed price and market price variables and the node device or node user may determine the bandwidth sharing history variables, current bandwidth need variables, download urgency variables, and the importance of payment number.

While the invention has been described, in embodiments, evaluating some or all of six factors, the invention is not limited to these factors. Additionally, while in the below examples, the different ratio variables are expressed in particular units, it is contemplated that, in embodiments, other units may be used. For example, the bandwidth need variables may be expressed in, e.g., kbps, Mb/hour, kb/hour, Mb/minute, kb/minute, etc. Additionally, the download urgency ratio variables may be expressed in any units of time, e.g., minutes, seconds, days, etc. Moreover, the bandwidth sharing ratio variables may be expressed in units of bandwidth, e.g., Mb, kb, gigabytes, etc. Additionally, the market price ratio variables may be expressed in units, e.g., $/kb, $/gigabyte, $/hour, etc. Further, the fixed price ratio variables may be expressed in units, e.g., $/kb, $/gigabyte, $/hour, cost/amount of bandwidth charged by the network carrier, number of minutes left on the data plan, cost/time of bandwidth, cost for time used over a fixed amount, etc. Furthermore, it is understood that the values of the ratio variables for each of the factors should be expressed in the same units.

Current Bandwidth Need

In considering a first factor, in embodiments, a node may decide to advertise as a lender or a borrower based on an assessment of current bandwidth need and a determination of a current bandwidth need value. The current bandwidth need value may be a ratio based on a current bandwidth need, as described in the below example. This factor may account for a node's current bandwidth requirements versus the node's current bandwidth capacity. The current bandwidth need ratio may be expressed by the following equation:

$$\text{current bandwidth need ratio} = (\text{current bandwidth required})/(\text{current bandwidth capacity}). \quad (1)$$

The current bandwidth required is a node's current requirement for bandwidth. The current bandwidth capacity is a node's current capacity of bandwidth.

For example, using equation (1), if a node has a current bandwidth requirement of 20 megabytes per second (Mbps) and a current bandwidth capacity of 10 Mbps, then the node's resulting current bandwidth need ratio would be 2. Alternatively, with a second example, if a node has a current bandwidth requirement of 10 Mbps and a current bandwidth capacity of 20 Mbps, then the node's resulting current bandwidth need ratio would be 0.5. Furthermore, with a third example, if a node has a current bandwidth requirement of 20 Mbps and a current bandwidth capacity of 20 Mbps, then the node's resulting current bandwidth need ratio would be 1.

With the first example, a current bandwidth need ratio of 2 may suggest that the node advertise as a borrower, as the value is greater than equilibrium, or 1. This makes sense, as the node only has half of the bandwidth capacity that is currently required, and may need to borrow bandwidth from other nodes to accomplish a download. Further, with the second example, a current bandwidth need ratio of 0.5 may suggest that the node advertise as a lender, as the value is less than 1. Again, this makes sense, as the node has twice the bandwidth capacity that is currently required, and may have excess bandwidth capacity to lend to other nodes. Lastly, in the third example, a current bandwidth need ratio of 1 resulted. This would suggest that the node would not advertise as either a borrower or a lender, as the value is 1, or equilibrium. Again, this makes sense, as the node only has exactly the bandwidth capacity that is currently required.

As can be seen with the above examples, when a node has a current bandwidth need ratio of greater than 1, analysis of the current bandwidth need factor may suggest that a node advertise as a borrower. When the node has a current bandwidth need ratio of less than 1, analysis of this factor may suggest that the node advertise as a lender. Additionally, when the node has a current bandwidth need ratio of about 1, analysis of this factor may suggest that the node decide to not advertise as borrower or a lender.

In this way, using a current bandwidth need value and/or a current bandwidth need ratio, a node may determine whether to advertise as a lender or a borrower in a bandwidth-sharing ad hoc network, based on their current bandwidth need.

In embodiments, analysis of the current bandwidth need ratio may include more options then simply advertise as a lender or a borrower, or not advertise at all. For example, the system may assign ranges of ratios. By way of illustration, if the current bandwidth need ratio is less than 0.5, then the node may strongly advertise as a lender. If the ratio is $\geq 0.5$ and $<0.8$, the node may weakly advertise as a lender. Additionally, if the ratio is $\geq 0.8$ and $\leq 1.2$, the node may decide to not advertise as a borrower or a lender. Further, if the ratio of $>1.2$ and $\leq 1.5$, the node may weakly advertise as a borrower. If the ratio is $>1.5$, the node may strongly advertise as a borrower. These ratio ranges are one non-limiting example implemented by the invention, and as such, the present invention contemplates other ratios.

In the situation where a node has determined a ratio that suggests the node should "strongly" advertise as a borrower, the node may advertise as a borrower, for example, regardless of high costs or a bandwidth sharing history rating. In the situation where the node has determined a ratio that suggests the node should "weakly" advertise as a borrower, the node may only advertise as a borrower, for example, if the market price is acceptable by the node, i.e., low. In the situation where a node has determined a ratio that suggests the node should "strongly" advertise as a lender, the node may advertise as a lender, for example, regardless of current bandwidth needs or current price. In the situation where a node has determined a ratio that suggests the node should "weakly" advertise as a lender, the node may advertise as a lender, for example, only if the market price is acceptable by the node, i.e., high.

Download Urgency

In considering a second factor, in embodiments, a node may decide to advertise as a borrower or a lender based on an assessment of download urgency and a determination of a download urgency value. The download urgency value may be a ratio based on download urgency, as described in the below example. The download urgency may affect the need for a node to change status. For example, if a node needs to download a large amount of data, yet the time that the data needs to be downloaded is many hours in the future, e.g., the file is available for the next two days, then the node may be influenced to not become a borrower, or be influenced to become a lender. In this situation, the download urgency may be deemed low because bandwidth is not immediately necessary, as the file is available for the next two days, and thus the amount of time to download the file is large. This may allow a node to reevaluate the situation again in the future, when, for example, the market value for bandwidth may be lower.

Likewise, for example, when the time required to download a file is short (e.g., the file needs to be downloaded within the next 10 minutes), the download urgency may be deemed high. With this example, the download urgency value may influence the node to advertise as a borrower to prevent the situation where the file cannot be downloaded. A download undertaken when the download urgency is high may be at the expense of the current market value of bandwidth and, as such, the node may pay a premium for the borrowed bandwidth.

In embodiments, a download urgency ratio may be determined according to the following equation:

$$\text{download urgency ratio} = \text{fixed period}/(\text{download window} - \text{download time}). \quad (2)$$

The fixed period is a node determined period of time that may be adjusted to a node user's needs. The download window is a time in which the download should occur. The download time is an estimated time required to download the data.

As with the current bandwidth need ratio, in embodiments, a download urgency ratio value of about a threshold, e.g., 1, may suggest that a node not advertise as either a borrower or a lender, a value of less than a threshold may suggest that a node advertise as a lender, and a value of more than a threshold may suggest that a node advertise as a borrower. Additionally, in embodiments, a node may decide to advertise as a borrower or lender according to the ratio ranges, as set forth above.

For example, using equation (2), if a node has a download window of 10 hours, a download time of 1 hour, and the fixed period is set at 4 hours, then a resulting download urgency ratio is $4/(10-1)$=approximately 0.444, suggesting that the node may advertise as a lender, as the download urgency ratio is less than 1. This makes sense because the node desires to complete a 1 hour download over the next 10 hours and thus the node may have no immediate urgency to download. However, for example, if the node only has a download window of 2 hours and a download time of 1 hour, then a download urgency ratio of $4/(2-1)$=4 would result, thus indicating a high download urgency, and suggesting that the node may advertise as a borrower.

The fixed period set forth in equation (2) may be adjusted by an individual node to reflect their individual bandwidth-sharing priorities. For example, setting a higher fixed period will generally result in higher download urgency ratios. Conversely, setting a lower fixed period will generally result in lower download urgency ratios. Using the above examples, and changing the fixed period to 8 hours, the resulting download urgency ratios are $8/(10-1)$=approximately 0.888, and $8/(2-1)$=8, respectively. Alternatively, using the above examples, and changing the fixed period to 2 hours, the resulting download urgency ratios are $2/(10-1)$=approximately 0.222, and $2/(2-1)$=2, respectively. Thus, it is understood that a node may adjust the fixed period of time to reflect their individual bandwidth-sharing priorities.

In the situation where the download time is equal to the download window, according to the download urgency ratio formula, a denominator of zero would result thus pushing the download urgency ratio to infinity. This makes sense, because, with this example, a node only has a window of time equal to the time required for download, and thus a high download urgency. Additionally, weighting this download urgency ratio (with a value of infinity) with a weighting other than zero will cause the weighted factor to approach infinity.

Additionally, a situation may arise where the download window is smaller than the time required for download. In this situation, a node may need more time to download a file than the time window in which the download should occur. With this situation, determining the download urgency ratio results in a negative number. However, as this situation describes a seemingly impossible situation, in that a node may not, for example, complete 2 hour download in a 1 hour window, when a negative number results from the determination of a download urgency ratio, this ratio may be disregarded in the determination of a final value.

Additionally, while the urgency value is described in terms of downloading, in embodiments, a node may desire to upload data. The same analysis would apply for uploading data as it does to downloading data, as a node may still need to borrow bandwidth to accomplish the upload.

Bandwidth Sharing History

In considering a third factor, in embodiments, a node may decide to advertise as a borrower or a lender based on an assessment of its bandwidth sharing history and a determination of a bandwidth sharing value. The bandwidth sharing value may be a ratio based on bandwidth sharing history, as described in the below example. The determination of a bandwidth sharing value may be a determination of a kudos rating or a karma (i.e., a "good" sharer or a "bad" sharer of bandwidth). Additionally, in embodiments, a bandwidth sharing ratio may be determined by the following equation:

bandwidth sharing ratio=(total bandwidth lent over a period time)/(total bandwidth borrowed over the period of time). (3)

The total bandwidth lent over a period of time is the total bandwidth a particular node has lent over a period of time. The total bandwidth borrowed over a period of time is the total bandwidth a particular node has borrowed over the period of time.

As with the current bandwidth need ratio, in embodiments, a bandwidth sharing ratio value of about a threshold, e.g., 1, may suggest that a node not advertise as either a borrower or a lender, a value of less than a threshold may suggest that a node advertise as a lender, and a value of more than a threshold may suggest that a node advertise as a borrower. Additionally, in embodiments, a node may decide to advertise as a borrower or lender according to the ratio ranges, as set forth above.

In embodiments, a node having a low bandwidth sharing ratio may cause other nodes to find the under-sharing node unattractive, or other nodes may charge higher rates to the under-sharing node to lend their bandwidth. Thus, when a node's bandwidth sharing ratio is too low, a node may be encouraged to advertise as a lender, even at the expense of having to lower lending rates, in order to raise their bandwidth sharing ratio. A node that monitors their bandwidth sharing history may ensure that the node may be attractive to any borrowers in the ad hoc network. For example, in embodiments, as a bandwidth sharing ratio drops below a threshold, e.g., 0.5, then this ratio may start to push the node more strongly to advertise as a lender, so that the bandwidth sharing ratio can be kept within an equilibrium range, e.g., between 0.8 and 1.2.

By way of a more explicit non-limiting example, using equation (3), if a node has lent 100 Mb of bandwidth over a period of time and has borrowed 1000 Mb of bandwidth over the period of time, then the node has been a borrower more than it has been a lender, and the node may be identified as a "bad" sharer. With this example, a bandwidth sharing ratio of 100/1000=0.1 results, suggesting that a node should advertise as a lender, as the bandwidth sharing ratio is less than 1.

To the contrary, if a node has lent 1000 Mb of bandwidth over a period of time and has borrowed 100 Mb of bandwidth over the period of time, then the node has been a lender more than it has been a borrower. In this example the node may be identified as a "good" sharer. With this example, a bandwidth sharing ratio of 1000/100=10.0 results, suggesting that the node should advertise as a borrower, as the bandwidth sharing ratio is greater than 1.

In embodiments, the period of time used to determine the bandwidth sharing ratio, as set forth in equation (3), may be set and adjusted by the node. Additionally, in embodiments, this time period may be any unit of time, e.g., a day, a week, or a month.

Current Market Driven Price

In considering a fourth factor, in embodiments, a node may decide to advertise as a lender or a borrower based on an assessment of current market driven prices and a determination of a market driven price value. The market driven price value may be a ratio based on the current market driven prices, as described in the below example. In this manner, the current market driven prices may affect the need for a node to change status, e.g., from a borrower to a lender or from a lender to a borrower. In embodiments, a market price ratio may be determined by the following equation:

market price ratio=(average market price)/(current market price). (4)

The average market price is an average market price for bandwidth over a period of time, and the current market price is the market price for bandwidth currently available.

As with the current bandwidth need ratio, in embodiments, a current market price ratio value of about a threshold, e.g., 1, may suggest that a node not advertise as either a borrower or a lender, a value of less than a threshold may suggest that a node advertise as a lender, and a value of more than a threshold may suggest that a node advertise as a borrower. Additionally, in embodiments, a node may decide to advertise as a borrower or lender according to the ratio ranges, as set forth above.

For example, using equation (4), if the current market driven price is $10/Mb and the average market price is $7/Mb, then the resulting market price ratio is 0.7. This would suggest the node advertise as a lender because, as a lender, the node may be receiving a payment rate higher than the current market average. Conversely, if the current market price remains the same, but the average market price is $13/Mb, then the resulting market price ratio is 13/10=1.3. This would suggest the node advertise as a borrower because, as a borrower, the node may pay a cheaper rate than the current market average.

As can be seen with the above examples, when an average market price is lower than the current market price, the node may be encouraged to advertise as a lender of bandwidth. Conversely, when the average market price is higher than the current market price, the node may be encouraged to advertise as a borrower of bandwidth.

In embodiments, the time period over which the average market price is averaged, as set forth in equation (4), may be determined by the node or service provider, and may be any period of time, e.g., a day, a week, or a month. Additionally, in embodiments, a node or service provider may change the time period over which the average market price may be determined.

Current Fixed Price

In considering a fifth factor, in embodiments, a node may decide to advertise as a lender or borrower based on an assessment of current fixed prices and a determination of a current fixed price value. The current fixed price value may be a ratio based on current fixed prices, as described in the below example. In this manner, the current fixed price for bandwidth may affect a node's determination to advertise as a lender or borrower. In making such an assessment, a node may consider the following fixed costs: cost/amount of bandwidth charged by the network carrier, number of minutes left on the data plan, cost/time of bandwidth, and/or cost for time used over a fixed amount, etc. Additionally, it is understood that fixed prices may be considered costs that are market insensitive or competition insensitive.

In embodiments, a current fixed price ratio may be determined by the following equation:

$$\text{fixed price ratio} = (\text{average fixed price})/(\text{current fixed price}). \quad (5)$$

The average fixed price is an average fixed price for bandwidth over a period of time. The current fixed price is a fixed price for bandwidth currently available.

As with the current bandwidth need ratio, in embodiments, a fixed price ratio value of about a threshold, e.g., 1, may suggest that a node not advertise as either a borrower or a lender, a value of less than a threshold may suggest that a node advertise as a lender, and a value of more than a threshold may suggest that a node advertise as a borrower. Additionally, in embodiments, a node may decide to advertise as a borrower or lender according to the ratio ranges, as set forth above.

For example, using equation (5), if the current fixed price is $10/Mb and the average fixed price is $7/Mb, then the resulting fixed price ratio is 0.7. This would suggest the node advertise as a lender because, as a lender, the node may be receiving a payment rate higher than the current fixed price average. Conversely, if the current fixed price remains the same, but the average fixed price is $13/Mb, then the resulting fixed price ratio is 13/10=1.3. This would suggest the node advertise as a borrower because, as a borrower, the node may pay a cheaper rate than the current fixed price average.

As can be seen with the above examples, when an average fixed price is lower than the current fixed price the node may be encouraged to advertise as a lender of bandwidth. Conversely, when the average fixed price is higher than the current fixed price the node may be encouraged to advertise as a borrower of bandwidth.

In another example, if a node has 10 minutes left on a plan for data minutes this may affect the decision to advertise as a lender. Using a variant of equation (5), a node may determine a ratio of the average number of data minutes on their plan versus the current number of data minutes. For example, a current fixed price ratio, in an alternative embodiment, may be determined by the following equation:

$$\text{fixed price ratio} = (\text{average number of data minutes})/(\text{current data minutes}). \quad (5a)$$

For example, using equation (5a), assuming a node has an average of 400 data minutes on a plan and only has 10 data minutes left currently, then a ratio of 400/10=40 results. This resulting ratio would suggest that the node advertise as a borrower. In contrast, if the node has unlimited minutes, perhaps this may increase the likelihood of advertising as a lender, as a ratio of $400/\infty$=a very small number results. This resulting ratio would suggest that the node may advertise as a lender. In further embodiments, this same idea may be applied to each of the other fixed price values.

Importance of Payment

In considering a sixth factor, in embodiments, a node may decide to advertise as a lender or a borrower based on an assessment the importance of receiving payment and determination of an importance of payment value. The importance of receiving payment value may be a ratio based on the importance of receiving payment, as described in the below example. In this manner, the importance of the node to receive payment may determine the need for the node to advertise as a lender or borrower.

In embodiments, an importance of payment ratio may be determined by the following equation:

$$\text{importance of payment ratio} = (\text{importance of payment number})/1. \quad (6)$$

In embodiments, the importance of payment number may be a value assigned by the node. In embodiments, a high importance of payment number should be a positive number less than 1. Conversely, a low importance of payment number should be a value greater than 1. Additionally, to maintain a balance around equilibrium (e.g., at 1), each importance of payment number (i.e., low and high) may be set an equal distance from 1.

As with the current bandwidth need ratio, in embodiments, an importance of payment ratio value of about a threshold, e.g., 1, may suggest that a node not advertise as either a borrower or a lender, a value of less than a threshold may suggest that a node advertise as a lender, and a value of more than a threshold may suggest that a node advertise as a borrower. Additionally, in embodiments, a node may decide to advertise as a borrower or lender according to the ratio ranges, as set forth above.

For example, if a node has a high importance of payment, i.e., the node has an interest in earning money, a node may assign an importance of payment number of 0.5, which results in an importance of payment ratio of 0.5/1=0.5. As this importance of payment ratio is less than 1, this may suggest that a node advertise as a lender. Alternatively, if a node has a low importance of payment, a node may assign an importance of payment number of 1.5, which results in an importance of payment ratio of 1.5/1=1.5. As this importance of payment ratio is greater than 1, this may suggest that a node advertise as a borrower.

Tabulation of the Factor Variables

In embodiments, a node may use a table to tabulate the factor variables, the factor values or ratios, the weightings, the weighted factors and the final weighted value, for example, as shown in FIG. 5. It is understood that the table of FIG. 5 is one embodiment, and the invention should not be limited to this embodiment. As shown in the table of FIG. 5, each of the factors may be listed in a "FACTOR" column, which may include a list of the factors and the respective factor variables. Additionally, in embodiments, the table may include a "VALUE" column, which may include the factor variable values and calculated values or ratios for the respective factors. In embodiments, the table may also include a "WEIGHT" column, which may include weightings for each factor. The weighting is a value determined by the node or service provider based on the relative importance level of the factor. A higher weighting would typically reflect a higher importance to the factor, and vice versa. In embodiments, the table may also include a "WEIGHTED FACTOR" column, which may include weighted factor values for each of the respective factors.

Additionally, in embodiments, in a similar manner to the table shown in FIG. 4, a node user may not see any or all of the table, as shown in FIGS. 5-8, on their device. Rather, a node user interface may prompt the node user for the factor ratio variables and the factor weightings, without the node user seeing the table. This embodiment may further include the node device outputting the final weighted value, so that a node user may decide whether to advertise as a borrower or a lender, or not advertise at all.

Weighting the Factors and Determining Final Value

Once the values representing the factors have been determined, a node (or service provider) may assign a weight to each or any of the factors. In this manner, the node (or service provider) may set individual priorities for the different factors. As discussed above, if only one of the factors is pertinent to a determination to advertise as a borrower or a lender in bandwidth-sharing ad hoc network, no weighting may be necessary, as there is only one factor. However, weighting of the factors may be necessary when a node determines that more than one factor is pertinent to the determination of whether to advertise as a borrower or a lender in bandwidth-sharing ad hoc network. This being the case, a node or service provider may weight the factors differently depending on the relative importance of each of the pertinent factors to the node.

For example, a particular node, in determining whether to advertise as a borrower or a lender in a bandwidth-sharing ad hoc network, may consider the current bandwidth needs more important than the bandwidth sharing history. In this example, a node may assign a higher weighting to the current bandwidth need factor and may assign a lower weighting to the bandwidth sharing history factor.

FIG. 6 shows an example of the table partially completed with information of the "FACTOR" column and the "WEIGHT" column. In embodiments, the node or service provider may complete the information needed to determine each factor value or ratio (e.g., the factor variable), as set forth above, and the weighting for each factor. As shown in FIG. 6, the factor ratios, weighted factors, and the final weighted value have not been determined.

In embodiments, the weighting may be a percentage weighting for each factor, such that the combined percentage weightings of all the factors sum to 100%. In embodiments, if a user of a node enters percentage weightings in the "WEIGHT" column that do not sum to 100% (or 1), then the user may receive an error message prompting the node user to reenter the weighting values. When assigning weights by using percentages, the weighted factor may be determined according to the following equation:

$$\text{weighted factor} = \text{ratio} * \text{weighting}. \quad (7)$$

The ratio may be a ratio determined for any one of the different factors, and the weighting is the assignable weighting for that factor.

In embodiments, a final weighted value may be determined by summing all of the one or more individual weighted factors deemed pertinent by the node for a determination of whether to advertise as a borrower or a lender in a bandwidth-sharing ad hoc network. The final weighted value may be used by the node to make a determination to advertise as a lender, a borrower, or not advertise as either a lender or a borrower. In embodiments, generally, if the final weighted value is less than a threshold, e.g., 1, then the node may advertise as a lender of bandwidth in the bandwidth-sharing ad hoc network. Conversely, if the final weighted value is greater than the threshold, then the node may advertise as a borrower of bandwidth in the bandwidth-sharing ad hoc network. Additionally, if the final weighted value is equal to the threshold, then the node may be suggested to not advertise as either a borrower or a lender.

In embodiments, analysis of the final weighted value may include more options then simply advertise as a lender or a borrower, or not advertise as either a lender or a borrower. For example, in embodiments, if the final weighted value is <0.5, then the node may strongly advertise as a lender. If the final weighted value is $\geq 0.5$ and <0.8, the node may weakly advertise as a lender. Additionally, if the final weighted value is $\leq 0.8$ and $\leq 1.2$, the node may decide to not advertise as a borrower or a lender. Further, if the final weighted value of >1.2 and $\leq 1.5$, the node may weakly advertise as a borrower. Also, if the final weighted value is >1.5, the node may strongly advertise as a borrower.

In the situation where a node has determined a final weighted value that suggests the node should "strongly" advertise as a borrower, the node may advertise as a borrower, for example, regardless of high costs or a bandwidth sharing history rating. In the situation where the node has determined a final weighted value that suggests the node should "weakly" advertise as a borrower, the node may only advertise as a borrower, for example, if the market price is good, i.e., low. In the situation where a node has determined a final weighted value that suggests the node should "strongly" advertise as a lender, the node may advertise as a lender, for example, regardless of current bandwidth needs or current price. In the situation where a node has determined a final weighted value that suggests the node should "weakly" advertise as a lender, the node may advertise as a lender, for example, only if the market price is good, i.e., high.

In embodiments, the processes and system will calculate ratios and weighted factors. For example, ratios calculated with the equations, set forth above, are shown in FIGS. 7 and 8. FIG. 7 shows an exemplary table, with the calculated ratio and weighted factors according to the example of FIG. 6. In this example, using the current bandwidth need ratio formula, a current bandwidth need ratio of 0.8 results. Further, using the download urgency ratio formula, a download urgency ratio of approximately 0.571 results. Additionally, using the bandwidth sharing ratio formula, a bandwidth sharing ratio of approximately 1.667 results. Furthermore, using the market price ratio formula, a market price ratio of 0.8 results. Additionally, using the fixed price ratio formula a fixed price ratio of 1.2 results. Moreover, using the importance of payment ratio formula, an importance of payment ratio of 0.5 results.

In the example of FIG. 7, a node has assigned a weight of 30% to the current bandwidth need factor, which is the highest weight. Thus, the node has decided that the current bandwidth need is the most important factor, as it has the highest percentage. Additionally, the total of the weightings sums to 100% (or 1). In the above example, using equation (7), the weighted factor for the current bandwidth need of 0.8*0.3=0.24 results. The other weighted factors may be determined for the other factors in a similar manner such that the weighted factor column may be completed. With this embodiment, utilizing percentages as the weightings, the sum of the weightings will always be 100%, or 1. Therefore, the step of dividing by the total sum of weightings, as may be required with other embodiments and discussed below, may be unnecessary with this embodiment.

In the table of FIG. 7, a final weighted value of approximately 0.963 results. This final weighted value may suggest that the node advertise as a lender, as the final weighted value is less than 1. Alternatively, in utilizing the ratio ranges set forth above, as this final weighted value is $\geq 0.8$ and $\leq 1.2$, this value may suggest that a node decide to not advertise as a borrower or a lender.

FIG. 8 shows an alternative method of assigning a weighting to any combination of the factors. More specifically, in alternative embodiments, a weighting may be accomplished by assigning a "weighting number" to each factor. When assigning a weighting number, the weighted factor may be determined according to the following equation:

$$\text{weighted factor} = (\text{ratio} * \text{weighting number})/(\text{sum of weighting numbers}). \quad (8)$$

The ratio may be a ratio determined for any one of the different factors. The weighting number is the assignable weighting for that factor. Also, the sum of weighting numbers is a sum total of all the weighting numbers assigned to all of the factors.

As shown in FIG. 8, the weighting values need not sum to 100%. Accordingly, this embodiment does not require a node or service provider calculate the sum of the weightings to ensure that it sums to 100%, or 1. However, this embodiment may necessitate further steps, i.e., the summing of all the weighting numbers and dividing the product of the ratio and the weighting number by the sum of the weighting numbers.

In the table of FIG. 8, a final weighted value of approximately 0.766 resulted. This final weighted value may suggest that the node advertise as a lender, as the final weighted value is less than 1. Additionally, in utilizing the ratio ranges set forth above, as this final weighted value is $\geq 0.5$ and $<0.8$, this value may suggest that the node decide to weakly advertise as a lender.

Further, in embodiments, a node user may have preset weightings that may apply when the node is in an ad hoc network, such that with each instance of potential bandwidth sharing, a node user may not need to enter weightings. Additionally, in embodiments, a node user may adjust their weightings at any time.

Additionally, in embodiments, while the determination of the weighted factor was described above as determining the product of a factor ratio and a factor weighting, other implementations are contemplated by the invention. For example, a weighted factor may be determined by raising the factor ratio to the power of the factor weighting.

Moreover, in embodiments, a node user, a node device, central server or a multiplexing service may reassess the factor ratio variables to determine a "fresh" final weighted value on a predetermined time schedule. For example, this reassessment may be performed periodically on a scheduled basis, e.g., each minute, hourly, daily, etc. Additionally, in embodiments, this reassessment may be event based, e.g., at a time when a node may wish to download a file or another node is requesting borrowed bandwidth. Moreover, in embodiments, the reassessment may be triggered manually by the node device or node user at any time. Further, in embodiments, the reassessment may be performed with certain factor ratio variables that may be susceptible to fluctuations, e.g., current market driven prices, average market prices, current fixed prices, and/or average fixed prices.

The process for determining whether a node in a bandwidth-sharing ad hoc network should advertise as a borrower or a lender may be implemented by a program or other automated system built into each node that utilizes the ad hoc network. In embodiments, this program may be written in, e.g., Java™ (trademark or registered trademark of Sun Microsystems, Inc., in the United States and other countries), PERL™ (the Perl logo is a trademark of the Perl Foundation), Windows® a Model Basic (registered trademark of Microsoft Corporation in the United States and other countries), etc. In embodiments, the program may constantly take input from the ad hoc network and constantly monitor local bandwidth usage to automatically determine the suggestion to advertise as a lender or borrower.

Flow Diagram

The steps of the flow diagram described herein may be implemented in the environment of FIG. 1. The flow diagram may equally represent a high-level block diagram of the invention. The steps of the flow diagram may be implemented and executed from either a server, in a client server relationship, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-RAN) and DVD.

Figure 9:
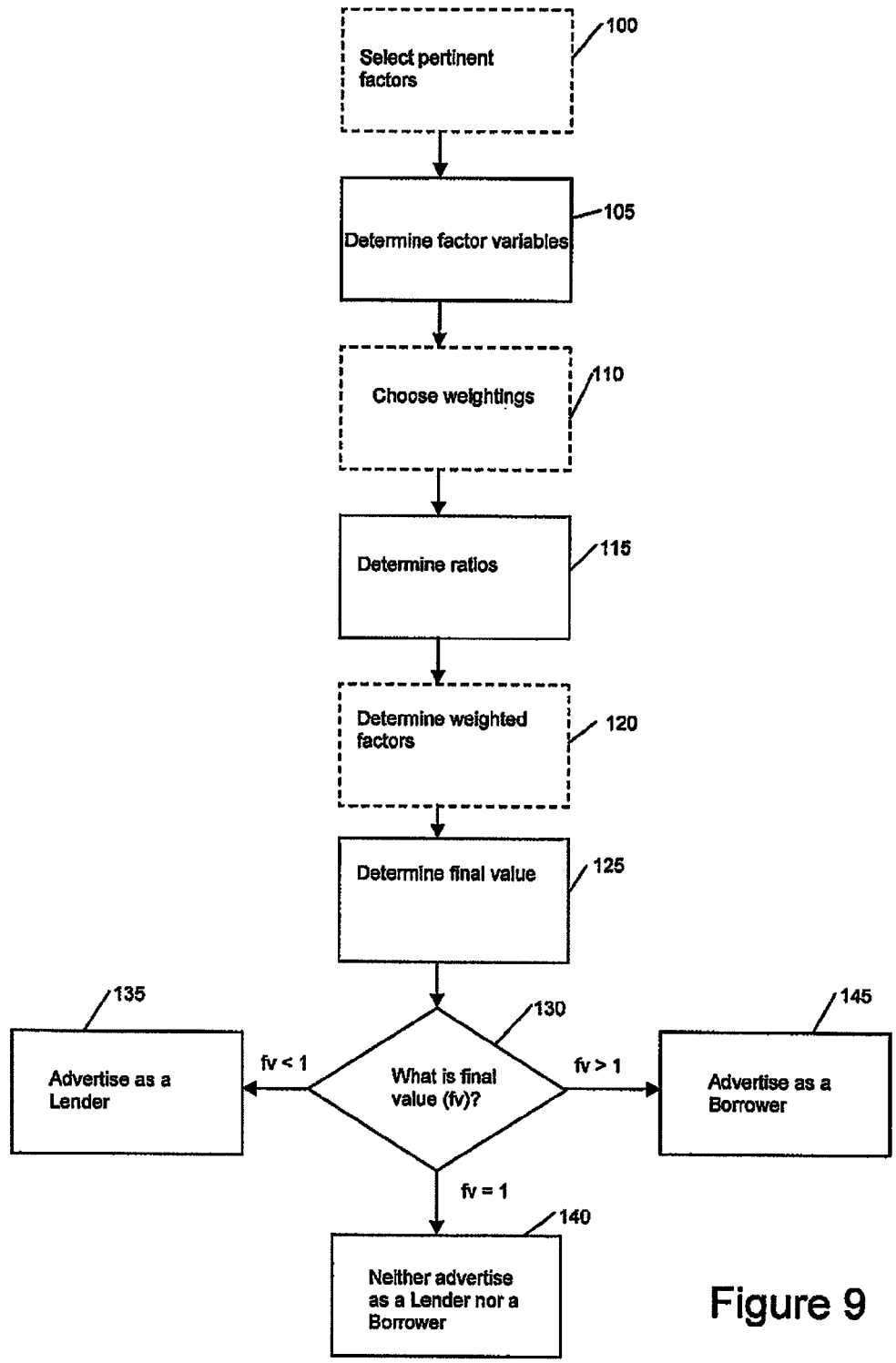
FIG. 9 is a flow chart of steps for implementing aspects of the invention.

FIG. 9 shows a flow chart for determining whether a node in a bandwidth-sharing ad hoc network should advertise either as a lender or a borrower of bandwidth, or alternatively not advertise as a either a lender or a borrower. While the flow chart of FIG. 9 shows an order of steps, it is noted that these steps may be completed in a different order. For example, a node may determine factor variables and select weightings before selecting pertinent factors. Additionally, a node may wait until the ratios or the weighted factors are determined before selecting which of the factors are pertinent. The dashes around steps 100, 110 and 120 indicate optional steps.

As shown in FIG. 9, at step 100, a node may select the factors most pertinent to the node in determining whether the node should advertise as a lender or a borrower in a bandwidth-sharing ad hoc network. A node, in embodiments, may decide that only one of the factors is pertinent, or alternatively, some or all of the factors are pertinent.

At step 105, a node or service provider may determine the factor variables. At step 110, a node or service provider may select weightings for the factors. However, as shown in FIG. 9 by dashed lines, step 110 may be an optional step. For example, weightings may not be necessary as only one of the factors may have been selected. At step 115, the ratio or ratios may be determined. At step 120, the weighted factors may be determined. Step 120 may be an optional step if only one of the factors was deemed pertinent. At step 125, a final value (fv) may be determined. In embodiments, the final value may be a final weighted value if more that one factor was deemed pertinent. Additionally, in embodiments, if only one factor was deemed pertinent, the final value may be a resulting factor value or factor ratio.

As shown in FIG. 9, at step 130, the determined final value is analyzed. If the final value is less than 1, at step 135, the node may be suggested to advertise as a lender of bandwidth. If the final value is greater than 1, at step 145, the node may be suggested to advertise as a borrower of bandwidth. If the final value is equal to 1, at step 140, the node may be suggested to not advertise as a lender or a borrower of bandwidth.

While the flow chart of FIG. 9 shows three options (e.g., advertise as a lender when fv<1, a borrower when fv>1, or not advertise as either when fv=1), it should be understood that, in embodiments, more options may be given. For example, as disclosed above, the ratio ranges may be used by the node to decide to strongly or weakly advertise as a borrower or a lender.

While the invention has been described in terms of embodiments, those skilled in the art will recognize that the invention can be practiced with modifications and in the spirit and scope of the appended claims.

What is claimed is:

1. A method comprising establishing an ad-hoc network between nodes configured to be a borrower of bandwidth or a lender of bandwidth, at least one of the nodes advertising to be the borrower of bandwidth or the lender of bandwidth in the ad hoc network based on at least one selected factor,
   wherein the at least one selected factor comprises at least one of current bandwidth need; download urgency; bandwidth sharing history of at least one of the nodes; current market driven price for bandwidth; current fixed price for bandwidth; and importance to receive compensation for lent bandwidth,
   each selected factor of the at least one selected factor has an associated value, and each value is analyzed to determine whether to advertise as the borrower or the lender,
   the value is expressed as a ratio,
   the ratio is at least one of a download urgency ratio; a bandwidth sharing ratio; a current market driven price ratio; a current fixed price ratio; and an importance of payment ratio, and
   the ratio above a predetermined threshold suggests advertising as the borrower, the ratio below the predetermined threshold suggests advertising as the lender.

2. The method of claim 1, wherein the steps of claim 1 are provided by a service provider under a subscription and/or fee agreement and/or based on advertising content to one or more third parties.

3. The method of claim 1, wherein a service provider at least one of creates, maintains, deploys and supports a computer infrastructure that performs the steps of claim 1.

4. The method of claim 1, further comprising, when considering to advertise as the lender or the borrower, determining an importance of payment value expressed by: (importance of payment number)/1.

5. The method of claim 1, further comprising, when considering to advertise as the lender or the borrower, determining a current fixed price value expressed by: (average number of data minutes)/(current data minutes).

6. The method of claim 1, further comprising, when considering to advertise as the borrower or the lender, determining a current fixed price value expressed by: (average fixed price)/(current fixed price).

7. The method of claim 1, further comprising providing a weighting to, each value to provide a weighted factor.

8. The method of claim 7, wherein the weighted factors are summed to determine a final-weighted value, the final weighted value being used to make a determination as to whether to advertise as the borrower or the lender.

9. The method of claim 1, further comprising, when considering to advertise as the borrower or the lender, determining a current bandwidth need value expressed by: (current bandwidth required)/(current bandwidth capacity).

10. The method of claim 1, further comprising, when considering to advertise as the borrower or the lender, determining a download urgency value expressed by: fixed period/(download window−download time).

11. The method of claim 1, further comprising, when considering to advertise as the borrower or the lender, determining a bandwidth sharing value expressed by: (total bandwidth lent over a period time)/(total bandwidth borrowed over the period of time).

12. The method of claim 1, further comprising, when considering to advertise as the borrower or the lender, determining a market driven price value expressed by: (average market price)/(current market price).

13. A system comprising a server having a database containing data associated with nodes capable of being lenders and borrowers of bandwidth in an ad-hoc network, the database further containing a selection of pertinent factors used by the nodes to determine whether the nodes should advertise as a lender of bandwidth or a borrower of bandwidth in the ad hoc network, and at least one of a hardware and software component for establishing the ad-hoc network between the borrowers of bandwidth and lenders of bandwidth by using certain factors of the pertinent factors in making a determination as to whether the nodes advertise as either the lender or the borrower,
   wherein the at least one of a hardware and a software component calculates a weighted factor based on the certain factors, the weighted factor for each of the certain factors being used to provide a final weighted value, the final weighted value being associated with a suggestion to advertise at least as one of the borrower and the lender.

14. The system of claim 13, wherein a service provider at least one of creates, maintains, deploys and supports the at least one of a hardware and software component.

15. The system of claim 14, wherein the at least one of a hardware and software component resides on a server provided by a service provider.

16. A method comprising establishing an ad-hoc network between nodes configured to be a borrower of bandwidth or a lender of bandwidth, at least one of the nodes advertising to be the borrower of bandwidth or the lender of bandwidth in the ad hoc network based on at least one selected factor, wherein the at least one selected factor comprises at least one of current bandwidth need; download urgency; bandwidth sharing history of at least one of the nodes; current market driven price for bandwidth; current fixed price for bandwidth; and importance to receive compensation for lent bandwidth;

basing the advertising as the borrower or the lender on at least two selected factors;

providing a weighting to each of the at least two selected factors to provide weighted factors; and summing the weighted factors to arrive at a final weighted value.

17. The method of claim 16, wherein:

the final weighted value is <0.5, then strongly advertise as the lender;

the final weighted value is $\geq 0.5$ and <0.8, then weakly advertise as the lender;

the final weighted value is $\geq 0.8$ and $\leq 1.2$, then not advertise;

the final weighted value is of >1.2 and $\leq 1.5$, then weakly advertise as the borrower; and the final weighted value is >1.5, then strongly advertise as the borrower.

18. The method of claim 16, wherein the weighted factors are determined according to one of: (ratio*weighting number)/(sum of weighting numbers) and (ratio*weighting).

19. A computer program product comprising a computer usable medium having readable program code embodied in the medium, wherein the computer usable medium comprises an apparatus that stores the program code, the computer program product includes at least one component to establish an ad-hoc network between at least one borrower of bandwidth and at least one lender of bandwidth by permitting advertising as a borrower or a lender of bandwidth based on at least one selected factor used by a node in determining whether to advertise as one of the borrower and the lender, wherein the ad hoc network comprises communication using a local wireless communication protocol between the at least one borrower and the at least one lender, wherein the computer program product is further configured to perform one of the following when considering to advertise as the borrower or the lender:

determine a current bandwidth need value expressed by: (current bandwidth required)/(current bandwidth capacity);

determine a download urgency value expressed by: fixed period/(download window−download time);

determine a bandwidth sharing value expressed by: (total bandwidth lent over a period time)/(total bandwidth borrowed over the period of time);

determine a market driven price value expressed by: (average market price)/(current market price);

determine a current fixed price value expressed by: (average fixed price)/(current fixed price);

determine a current fixed price value expressed by: (average number of data minutes)/(current data minutes); and determine an importance of payment value expressed by: (importance of payment number)/1.

20. A method for providing a formation of a multiplexed ad-hoc network, comprising providing a computer infrastructure that includes at least one computer device that operates to establish an ad-hoc network between at least one borrower of bandwidth and at least one lender of bandwidth by permitting advertising as a borrower or a lender of bandwidth, the advertising being based on at least one selected factor used by a node in determining whether to advertise as one of the borrower and the lender, wherein the ad hoc network comprises communication using a local wireless communication protocol between the at least one borrower and the at least one lender, wherein the computer device is further configured to perform one of the following when considering to advertise as the borrower or the lender:

determine a current bandwidth need value expressed by: (current bandwidth required)/(current bandwidth capacity);

determine a download urgency value expressed by: fixed period/(download window−download time);

determine a bandwidth sharing value expressed by: (total bandwidth lent over a period time)/(total bandwidth borrowed over the period of time);

determine a market driven price value expressed by: (average market price)/(current market price);

determine a current fixed price value expressed by: (average fixed price)/(current fixed price);

determine a current fixed price value expressed by: (average number of data minutes)/(current data minutes); and determine an importance of payment value expressed by: (importance of payment number)/1.

21. A method, comprising:

selecting one or more pertinent factors based on a willingness to be a lender or a borrower of bandwidth in an ad hoc network; and advertising as the borrower or the lender based on the selected pertinent factors to establish a bandwidth-sharing ad-hoc network, wherein a computer device is used to perform the selecting and the advertising, the selected pertinent factors comprise at least one of current bandwidth need; download urgency; bandwidth sharing history of at least one of the nodes; current market driven price for bandwidth; current fixed price for bandwidth; and importance to receive compensation for lent bandwidth, each selected pertinent factor has an associated value expressed as a ratio, and each value is analyzed to determine whether to advertise as the borrower or the lender, and further comprising providing a weighting to each value to provide weighted factors and summing the weighted factors to determine a final weighted value used to make a determination as to whether to advertise as the borrower or the lender.

22. The method of claim 21, wherein a service provider at least one of creates, maintains, deploys and supports a computer infrastructure that performs the steps of claim 21.

23. The method of claim 21, wherein the steps of claim 21 are provided by a service provider under a subscription and/or fee agreement and/or based on advertising content to one or more third parties.

24. The method of claim 21, wherein the ratio is at least one of a download urgency ratio; a bandwidth sharing ratio; a current market driven price ratio; a current fixed price ratio; and an importance of payment ratio.

25. The method of claim 24, wherein the ratio above a predetermined threshold suggests advertising as the borrower and the ratio below the predetermined threshold suggests advertising as the lender.

\* \* \* \* \*